United States Patent
He et al.

(10) Patent No.: US 12,505,458 B2
(45) Date of Patent: Dec. 23, 2025

(54) BUSINESS PROCESS STARTING METHOD AND APPARATUS

(71) Applicant: Advanced New Technologies Co. Ltd., Grand Cayman (KY)

(72) Inventors: Sanyuan He, Zhejiang (CN); Yan Xia, Zhejiang (CN)

(73) Assignee: Advanced New Technologies Co. Ltd., Grand Cayman (KY)

( * ) Notice: Subject to any disclaimer, the term of this patent is extended or adjusted under 35 U.S.C. 154(b) by 170 days.

(21) Appl. No.: 16/435,874

(22) Filed: Jun. 10, 2019

(65) Prior Publication Data

US 2019/0294939 A1    Sep. 26, 2019

Related U.S. Application Data

(63) Continuation of application No. PCT/CN2018/090213, filed on Jun. 7, 2018.

(30) Foreign Application Priority Data

Jun. 9, 2017   (CN) .......................... 201710432079.9

(51) Int. Cl.
*G06Q 30/02* (2023.01)
*G06F 9/445* (2018.01)
(Continued)

(52) U.S. Cl.
CPC ............. *G06Q 30/02* (2013.01); *G06F 9/445* (2013.01); *G06F 9/54* (2013.01); *G06F 16/955* (2019.01);
(Continued)

(58) Field of Classification Search
CPC .. G06F 16/583; G06K 19/14; G06K 2209/01; G06K 7/0004; G06K 7/0008;
(Continued)

(56) References Cited

U.S. PATENT DOCUMENTS 8,165,381 B1    4/2012   Ferris et al.
8,606,645 B1 *  12/2013  Applefeld .............. G06Q 30/02
                                                705/26.1
(Continued)

FOREIGN PATENT DOCUMENTS

CN          102595246 A       7/2012
CN          102902670 A       1/2013
(Continued)

OTHER PUBLICATIONS

Extended European Search Report for counterpart European Application No. 18813223.7 from the European Patent Office, dated Jan. 14, 2020.

(Continued)

*Primary Examiner* — Thien M Le
*Assistant Examiner* — Tae W Kim
(74) *Attorney, Agent, or Firm* — Finnegan, Henderson, Farabow, Garrett & Dunner, LLP

(57) ABSTRACT

A business process starting method, which is applied to a terminal and includes: acquiring multimedia data, the multimedia data carrying image data of a predetermined scenario, and uploading the multimedia data to a server; receiving business entry information returned by the server, wherein the server maintains a correspondence between standard image information of predetermined scenarios and business entry information, and the returned business entry information corresponds to standard image information matching the uploaded image data; and starting a business process based on the business entry information. The technical solution of the present application starts a corresponding business process by using a predetermined scenario that is easy to distinguish, thereby avoiding a wrong business process caused by the scanning of a wrong two-dimensional (Continued)

code, and increasing the security of a business while improving user experience.

13 Claims, 6 Drawing Sheets

(51) Int. Cl.
    *G06F 9/54*     (2006.01)
    *G06F 16/955*     (2019.01)
    *G06K 7/14*     (2006.01)
    *G06K 19/06*     (2006.01)
    *G06Q 20/02*     (2012.01)
    *G06Q 20/32*     (2012.01)
    *G06Q 20/40*     (2012.01)
    *G06Q 30/00*     (2023.01)

(52) U.S. Cl.
    CPC ..... *G06K 7/1408* (2013.01); *G06K 19/06103* (2013.01); *G06Q 20/02* (2013.01); *G06Q 20/3276* (2013.01); *G06Q 20/40* (2013.01); *G06Q 30/00* (2013.01)

(58) Field of Classification Search
    CPC ........... G06K 7/10386; G06K 7/10722; G06K 7/10851; G06K 9/228; G06K 9/726; G06Q 20/105; G06Q 20/1085; G06Q 20/32; G06Q 20/3276; G06Q 20/425; G06Q 30/0207; G06Q 30/06; G06Q 40/00; G07F 19/20
    USPC ......................................................... 235/375
    See application file for complete search history.

(56) References Cited

U.S. PATENT DOCUMENTS

| | | | | |
|---|---|---|---|---|
| 2002/0184203 | A1* | 12/2002 | Nastar | G06Q 30/06 |
| 2004/0118920 | A1* | 6/2004 | He | G06K 7/10386 |
| | | | | 235/454 |
| 2008/0059372 | A1* | 3/2008 | Lee | G06Q 20/425 |
| | | | | 705/41 |
| 2014/0319209 | A1* | 10/2014 | Beadles | G06Q 30/0207 |
| | | | | 235/375 |
| 2016/0012428 | A1 | 1/2016 | Haldenby et al. | |

FOREIGN PATENT DOCUMENTS

| | | | |
|---|---|---|---|
| CN | 103106579 | A | 5/2013 |
| CN | 103793810 | A | 5/2014 |
| CN | 105335469 | A | 2/2016 |
| CN | 105608230 | A | 5/2016 |
| CN | 106022738 | A | 10/2016 |
| JP | 2005182350 | A | 7/2005 |
| JP | 2005215922 | A | 8/2005 |
| JP | 2009110204 | A | 5/2009 |
| JP | 2011154520 | A | 8/2011 |
| JP | 2015506004 | A | 2/2015 |
| KR | 20140015697 | A | 2/2014 |
| KR | 20150068540 | A | 6/2015 |
| WO | WO 2006/095356 | A1 | 9/2006 |
| WO | WO-2014032579 | A1 * | 3/2014 .......... G06F 40/134 |

OTHER PUBLICATIONS

International Search Report for International Application No. PCT/CN2018/090213, mailed on Sep. 10, 2018.
Office Action of Japanese Application No. 2019-531230, issued on Oct. 13, 2020.
Office Action of Korean Application No. 10-2019-7017834, issued on Nov. 12, 2020.
Decision of Patent Grant for Korean Application No. 10-2019-7017834, mailed Jul. 1, 2021.
Office Action of Korean Application No. 10-2019-7017834 issued on May 17, 2021.
Examination Report for Indian Application No. 201917024211, mailed Apr. 28, 2021, 8 pages.
Notice of Reasons for Rejection for Japanese Application No. 2019-531230, mailed Jul. 30, 2021.
Office Communication for counterpart European Application No. 18813223.7 from the European Patent Office, dated Oct. 14, 2021.
Decision of Dismissal of Amendment for Japanese Application No. 2019-531230, mailed Feb. 14, 2022.
Decision of Rejection for Japanese Application No. 2019-531230, mailed Feb. 14, 2022.
Notice for Eligibility of Grant for counterpart Singapore Application No. 11201905538T, issued on Jul. 26, 2022.
Supplementary Examination Report from the Intellectual Property Office of Singapore for counterpart Singapore Application No. 11201905538T, issued on Jul. 25, 2022.
Written Opinion of the International Searching Authority for International Application No. PCT/CN2018/090213, mailed on Sep. 10, 2018.
Examination Report for counterpart Malaysia Application No. PI2019003438, issued on Nov. 30, 2022.

* cited by examiner

100

```
┌─────────────────────────────────────────────────────────────────┐
│  Acquiring multimedia data carrying image data of a predetermined │ ~ 110
│  scenario, and uploading the same to a server terminal          │
└─────────────────────────────────────────────────────────────────┘
                                │
                                ▼
┌─────────────────────────────────────────────────────────────────┐
│  Receiving business entry information returned by the server terminal, │
│  wherein the server terminal maintains a correspondence between standard │
│  image information of predetermined scenarios and the business entry │ ~ 120
│  information, and the returned business entry information corresponds to │
│  standard image information matching the uploaded image data    │
└─────────────────────────────────────────────────────────────────┘
                                │
                                ▼
┌─────────────────────────────────────────────────────────────────┐
│  Locally saving a device certificate for performing payment through a │ ~ 130
│  corresponding user account                                     │
└─────────────────────────────────────────────────────────────────┘
```

Fig. 1

BUSINESS PROCESS STARTING METHOD AND APPARATUS

CROSS-REFERENCE TO RELATED APPLICATIONS

This application is a continuation application of International Application No. PCT/CN2018/090213, filed on Jun. 7, 2018, which is based upon and claims priority to Chinese Patent Application No. 201710432079.9, filed on Jun. 9, 2017, the entire content of all of which is incorporated herein by reference.

TECHNICAL FIELD

The present application relates to the technical field of network communication, and in particular to a business process starting method and apparatus.

TECHNICAL BACKGROUND

With the development of network technology and the popularity of smart terminals, users are becoming more and more accustomed to using a network to complete various matters in work and life. These matters can be seen as network-based businesses. In a business performed in combination with offline scenarios, how to quickly and conveniently start a business process becomes a key issue in business implementation.

In the prior art, it is the most common to use a two-dimensional code to start a business process. A user can scan a two-dimensional code presented by others or a merchant by using a terminal, so as to add others as a friend, pay the merchant, etc., on a social media. Since a two-dimensional code is not identifiable to humans, in some application scenarios, security of a business process may be affected. For example, in the application where a merchant starts a receipt process through a two-dimensional code, if someone attaches a two-dimensional code of his/her own account onto the two-dimensional code presented by the merchant, the user will transfer money that should be paid to the merchant to the person, causing the user or merchant to suffer losses.

SUMMARY

According to one aspect, a business process starting method, which is applied to a terminal, and comprises: acquiring multimedia data, the multimedia data carrying image data of a predetermined scenario, and uploading the multimedia data to a server; receiving business entry information returned by the server, wherein the server maintains a correspondence between standard image information of predetermined scenarios and business entry information, and the returned business entry information corresponds to standard image information matching the uploaded image data; and starting a business process based on the business entry information.

According to another aspect, a business process starting method, which is applied to a server, the server maintaining a correspondence between standard image information of predetermined scenarios and business entry information, and comprises: receiving multimedia data uploaded by a terminal, the multimedia data carrying image data of a predetermined scenario; searching for standard image information matching the uploaded image data; and returning, to the terminal, business entry information corresponding to the standard image information matching the uploaded image data.

According to still another aspect, a terminal and comprises: a processor; and a memory for storing instructions executable by the processor, wherein the processor is configured to: acquire multimedia data, the multimedia data carrying image data of a predetermined scenario, and upload the same to a server; receive business entry information returned by the server, wherein the server maintains a correspondence between standard image information of several predetermined scenarios and business entry information, and the returned business entry information corresponds to standard image information matching the uploaded image data; and start a business process based on the business entry information.

According to yet another aspect, a server, the server maintaining a correspondence between standard image information of several predetermined scenarios and business entry information, comprises: a processor; and a memory for storing instructions executable by the processor, wherein the processor is configured to: receive multimedia data uploaded by a terminal, the multimedia data carrying image data of a predetermined scenario; search for standard image information matching the uploaded image data; and return, to the terminal, business entry information corresponding to the standard image information matching the uploaded image data.

It can be seen from the above technical solution that, in the embodiments of the specification, a correspondence between standard image information of a predetermined scenario and business entry information is preset on a server, and after a terminal acquires and uploads image data of the predetermined scenario, the server issues, to the terminal, the business entry information corresponding to the standard image information matching the uploaded image data for the terminal to start a business process. By using a predetermined scenario that is easy to recognize to start a corresponding business process, the embodiments of the specification avoid a wrong business process caused by the scanning of a wrong two-dimensional code, and increasing the security of a business while improving user experience.

BRIEF DESCRIPTION OF THE DRAWINGS

FIG. 1 is a flowchart of a business process starting method applied to a terminal, according to an embodiment.

DETAILED DESCRIPTION

Figure 2:
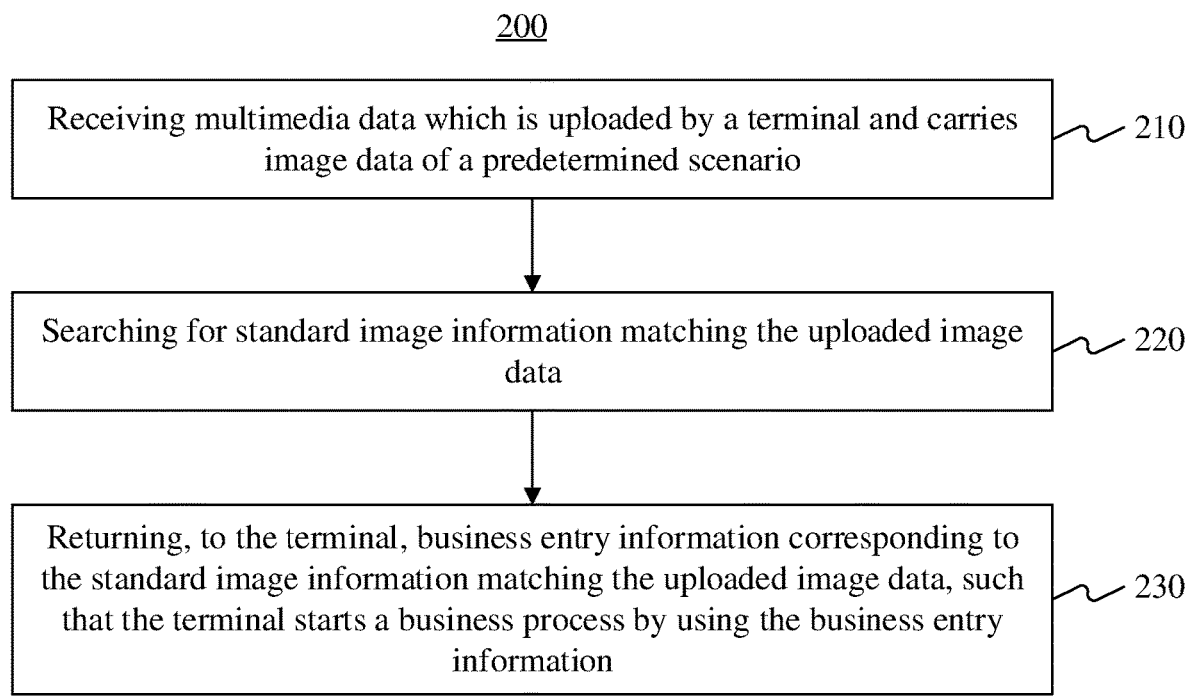
FIG. 2 is a flowchart of a business process starting method applied to a server, according to an embodiment.

Embodiments of the specification provide a new business process starting method, in which a correspondence between standard image information of a predetermined scenario and business entry information is preset at a server, and a terminal obtains, by providing image data of the predetermined scenario to the server, the corresponding business entry information by means of an image matching technique to start the corresponding business process, such that a user can confirm the started business process from the image data to avoid a security loophole due to a two-dimensional code being unable to be distinguished by the user, thereby solving the problems existing in the prior art.

In the embodiments of the specification, the terminal and the server can access each other via a network. The terminal may be a device, such as a mobile phone, a tablet computer, a PC (Personal Computer), a notebook, etc.; and the server may operate as one or more devices such as a PC, a notebook, a server terminal, etc., and various functions of the server may be implemented by means of the mutual coordination of two or more separately running logical servers. The embodiments of the specification do not limit the device type of the terminal and the server, as well as the type and protocol of the network between the terminal and the server.

In the embodiments of the specification, a correspondence between standard image information of a predetermined scenario and business entry information is preset at the server. The predetermined scenario is an objective object which is related to a business process to be started and can be distinguishable by human eye. The object may be a real entity object, such as a facade of an entity merchant, a user's face, and the like, and may also be a distinguishable virtual object, such as a merchant logo or a merchant trademark. The standard image information of the predetermined scenario may be an image of the predetermined scenario (also referred to as a standard image of the predetermined scenario), may also be thumbnail information generated by means of an image processing technique according to the standard image of the predetermined scenario, such as an image feature code (also referred to as a standard feature code) generated according to a color feature, a texture feature, a shape feature, and/or a spatial relationship feature, and may also be a combination of the standard image of the predetermined scenario and the thumbnail information of the standard image, which will not be limited here.

The business process entry information may be various pieces of information required when the terminal starts a certain business process, and can be determined according to one or more factors such as a working mode between the terminal and the server in the actual application, and a business running mode, which will not be limited here.

For example, in applications implemented based on a B/S (Browser/Server) mode or a C/S (Client/Server) mode between the terminal and the server, the business process entry information may be a page address of a business process start page accessed via a network, such as a URL (Uniform Resource Locator) address of an H5 (the Fifth Generation Hypertext Markup Language) page, starting a specific business process when the terminal accesses the page, and may also be invoking information for a business entry program, starting a specific business process when the terminal starts running the business entry program by using the invoking information. The business entry program can be run in the network, so as to be accessed by the terminal by means of an interface in the invoking information, and may also be locally run in the terminal after the terminal downloads the same from the network by using a download address in the invoking information.

For another example, in an application implemented based on the C/S mode between the terminal and the server, client software corresponding to the server is locally installed on the terminal; and the business entry information may be a page address of a local page of the client, such as a page address of a native (local method) page, the local page being a business process start page, and may also be invoking information for a business entry program in the client, such that the terminal can start a business process by using the invoking information to start an executable program in the local client.

In addition, the business process in the embodiments of the specification may be any of items performed by the terminal in coordination with the server, or a processing stage in the item, for example, adding and following a friend, etc., in a social network, and for another example, initiating a shopping request, receipt and payment, etc.

The correspondence between the standard image information of the predetermined scenario and the business entry information may be registered by a user to the server and may also be automatically generated by the server, which will not be limited in the embodiments of the specification. In one embodiment, the server provides, to a user, services of registering a predetermined scenario and starting a business process, and after receiving a standard image of the predetermined scenario uploaded by the user and corresponding business entry information, the server generates standard image information according to the standard image and saves a correspondence between the standard image information and the business entry information. In another embodiment, the server automatically acquires a logo image already registered by a merchant with the server as a standard image of a predetermined scenario, and after generating standard image information, saves a correspondence between the standard image information and a page address of a start page of a business process provided for the merchant (such as paying the merchant).

FIG. 1 is a flow chart of a business process starting method 100 running on a terminal, according to an embodiment. FIG. 2 is a flow chart of a business process starting method 200 running on a server, according to an embodiment. Referring to FIGS. 1 and 2, the methods 100 and 200 may include the following steps.

At step 110, the terminal acquires multimedia data carrying image data of a predetermined scenario, and uploads the multimedia data, including the image data, to the server.

At step 210, the server receives the multimedia data, which is uploaded by the terminal and carries image data of the predetermined scenario.

In the embodiment, when a user wishes to start a business process associated with a predetermined scenario, the terminal obtains multimedia data carrying image data of the predetermined scenario by means of operations on the terminal and uploads the multimedia data to the server.

The multimedia data carrying image data of the predetermined scenario may be a picture or a video. The terminal may upload, to the server, a generated picture or video, such as a picture taken for the predetermined scenario, a video shot for the predetermined scenario, or a picture or video saved on the terminal, downloaded from a network or received from a terminal of another user and having predetermined scenario content. The terminal may also upload, to the server, a picture or video obtained by means of real-time scanning, such as scanned data of the predetermined scenario.

At step 220, the server searches for standard image information matching the uploaded image data.

In the embodiment, after the server receives the multimedia data uploaded by the terminal, for the picture, the server can use the same as the uploaded image data of the predetermined scenario, and for the video, the server can extract one to more frames of pictures therefrom, and use an extracted picture as the uploaded image data. The server searches for standard image information matching the uploaded image data from a correspondence, maintained thereby, between the standard image information and the business entry information.

For the application of the standard image as the standard image information, the server can determine, by using an image matching algorithm, whether the uploaded image data matches the standard image. For example, the image matching algorithm may be a geometry method, a model method, a signal processing method, a boundary feature method, a Fourier shape description method, a geometric parameter method, a shape invariant moment, etc., which one of ordinary skill in the art would understand and will not be elaborated here.

For the application of the thumbnail information of the standard image as the standard image information, the server can match thumbnail information of the uploaded image data with the thumbnail information of the standard image. Taking a standard feature code as an example, the server can generate an upload feature code according to the uploaded image data, and search for a standard feature code of which a degree of matching with the upload feature code exceeds a set matching threshold value.

For the application of a combination of the standard image and the thumbnail information of the standard image as standard image information, one, or two in combination, of the matching methods above can be used.

In some embodiments, predetermined scenarios are presented in physical stores, such that users photograph the predetermined scenarios and then use the same to start a business process. In these embodiments, a correspondence between standard image information of predetermined scenarios as well as geographic locations of the predetermined scenarios and the business entry information can be maintained on the server. The terminal uploads, to the server, location information of a current geographic location; and the server searches predetermined scenarios for the standard image information matching the uploaded image data, wherein a distance from the predetermined scenario's address location to the uploaded location information does not exceed a set deviation threshold value. For example, the server determines a geographic range by taking the location information uploaded by the terminal as a center and taking the set deviation threshold value as a radius, so as to search for the standard image information matching the uploaded image data in the predetermined scenario where the address location is within the range. In this way, the amount of standard image information that needs to be matched is greatly reduced, and the query speed is thus greatly accelerated. The terminal may upload the location information while uploading the multimedia data, and may also upload the location information to the server before or after uploading the multimedia data, which will not be limited here.

At step 230, the server returns, to the terminal, business entry information corresponding to the standard image information matching the uploaded image data, such that the terminal starts the business process based on the business entry information.

At step 120, the terminal receives the business entry information returned by the server, wherein the returned business entry information corresponds to the standard image information matching the uploaded image data.

As described above, the server maintains a correspondence between standard image information of predetermined scenarios and business entry information. After the server finds the standard image information matching the uploaded image data, the business entry information corresponding to the standard image information is returned to the terminal.

If the server does not find the standard image information matching the uploaded image data, a message that there is no matched predetermined scenario can be returned to the terminal, and the terminal notifies a user of a business start failure.

At step 130, the terminal starts a business process based on the business entry information returned by the server. In one embodiment, the business process is an online payment process, the terminal locally saves a device certificate for performing payment through a corresponding user account.

The terminal starts the business process in a corresponding manner according to content of the returned business entry information. For example, in the case where the business entry information is the page address of the business process start page, the terminal opens a start page of the business process by using a page address (a local page address or a page address in a network) returned by the server. For another example, in the case where the business entry information is invoking information for a business entry program, the terminal starts the business process by using the returned invoking information to run the business entry program.

It can be seen that, in the embodiments of the specification, a correspondence between standard image information of a predetermined scenario and business entry information is preset on a server, and the server issues, after a terminal provides image data of the predetermined scenario to the server, the business entry information corresponding to the standard image information matching the uploaded image data to the terminal so as to start a corresponding process, such that a user can confirm the started business process from a distinguishable visual image, thereby avoiding a wrong business process caused by the scanning of a wrong two-dimensional code, and increasing the security of a business while improving user experience.

In one embodiment, a user at a third-party payment platform may pay a merchant of a physical store by photographing a predetermined scenario registered by the merchant. The merchant registers a scenario used thereby to a server of the third-party payment platform, and uploads a standard image of the predetermined scenario and a geographic location of the store to the server. The server generates a URL of a page for payment to the merchant, and adds the standard image of the predetermined scenario uploaded by the merchant, a standard feature code generated from the standard image, the geographic location of the store, and the URL of the page for payment to the merchant to a correspondence table between the image and the page address, which is maintained by the server.

Figure 3:
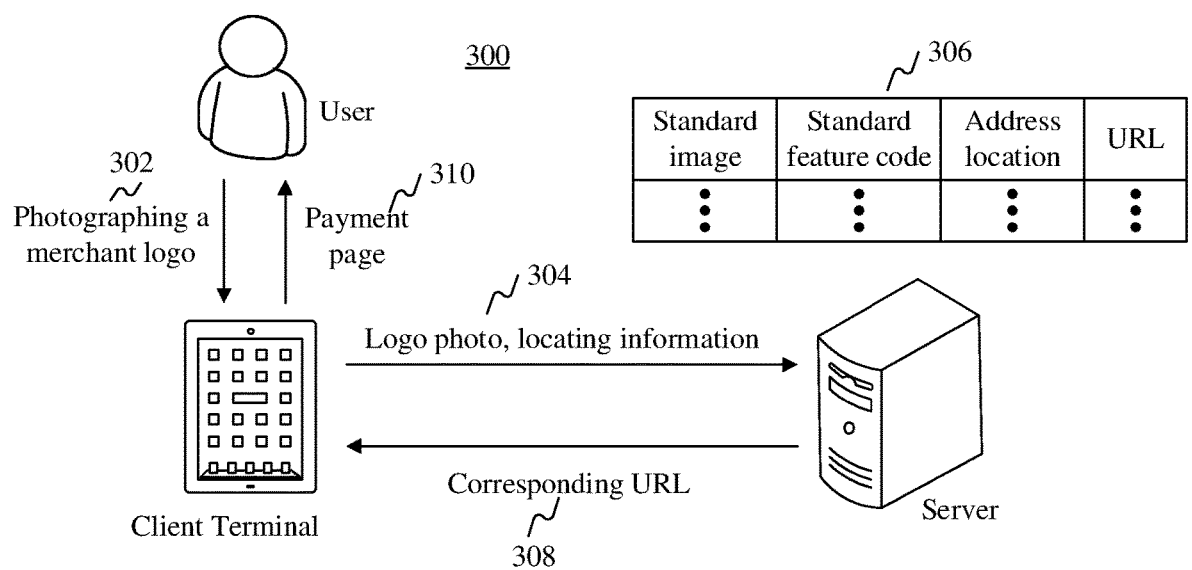
FIG. 3 is a schematic diagram of an interaction between a user, a terminal, and a server, according to an embodiment.

When the predetermined scenario registered by the merchant is a logo of the merchant, after the registration is completed, the merchant can inform the user that payment can be carried out by uploading a photo of the logo. FIG. 3 is a schematic diagram illustrating a process 300 when the user completes a consumption activity in the physical store and wants to pay the merchant, according to an embodiment. The process 300 includes an interaction between the user, the terminal and the server.

Referring to FIG. 3, the user photographs, by means of the terminal, the logo presented by the merchant to obtain a logo photo (a type of multimedia data carrying image data of a predetermined scenario) of the merchant (302), and a third-party payment platform client installed on the terminal uploads the logo photo to the server (304). The client simultaneously uploads current GPS locating data (a type of location information) of the terminal to the server (304).

The server generates an upload feature code from the logo photo uploaded by the terminal with the installed client (referred to herein as the client terminal), extracts, from a correspondence table, a standard feature code of which a distance between the address location of the store and the GPS locating data of the terminal is within a set deviation threshold value range, compares the standard feature code with the upload feature code, and uses the standard feature code of which a comparison result exceeds a set matching threshold value as the standard feature code of the merchant logo (306).

The server returns a URL corresponding to the standard feature code of the merchant logo to the client terminal (308). After the client terminal manually inputs the URL, the user is prompted whether to jump to the page for payment to the merchant, and if the user confirms the jump, the client terminal opens the payment page of which the address is the URL and starts a business process of the user paying the merchant (310).

In the prior art, a user obtains a jump link for a payment page by scanning a two-dimensional code presented by a merchant. This method requires printing a two-dimensional code, which increases the cost of the merchant, and the two-dimensional code presented by the merchant does not have a brand meaning and a scenario meaning, which affects the willingness of the merchant to promote. In this embodiment, the user obtains the jump link for the payment page by uploading a logo photo of the merchant without the need of the merchant printing the two-dimensional code, which saves on the cost; moreover, this method can make the user pay attention to the logo, thereby resulting in a stronger promotion willingness. In addition, the user may photograph the logo presented by the merchant or find the logo of the merchant in a real scenario to scan, which increases the interestingness.

Corresponding to the above-described process implementation, embodiments of the specification further provide business process starting devices and apparatus.

Figure 4:
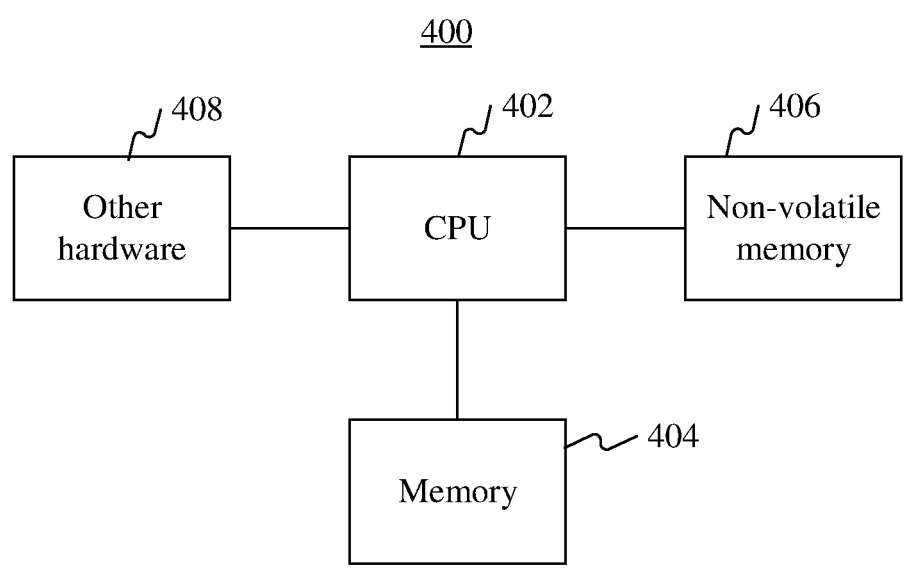
FIG. 4 is a block diagram of a business process starting device, according to an embodiment.

FIG. 4 is a block diagram of a business process starting device 400, according to an embodiment. Referring to FIG. 4, the device 400 may be a terminal, such as the terminal illustrated in connection with FIGS. 1-3, or a server, such as the server illustrated in connection with FIGS. 1-3. The device 400 may include a CPU (Central Process Unit) 402, a memory 404 (including a non-volatile memory 406), and other hardware 408, such as a chip for transmitting and receiving wireless signals, a board card for implementing a network communication interface, an input/output interface, etc.

The CPU 402 may include one or more dedicated processing units, application-specific integrated circuits (ASICs), field-programmable gate arrays (FPGAs), or various other types of processors or processing units. The CPU 402 is coupled with the memory 404 and is configured to execute instructions stored in the memory 404 to perform the above described methods.

The memory 404 may include a non-permanent memory, a random access memory (RAM) and/or a non-volatile memory (such as a read-only memory (ROM) or a flash memory (flash RAM)), etc.

Figure 5:
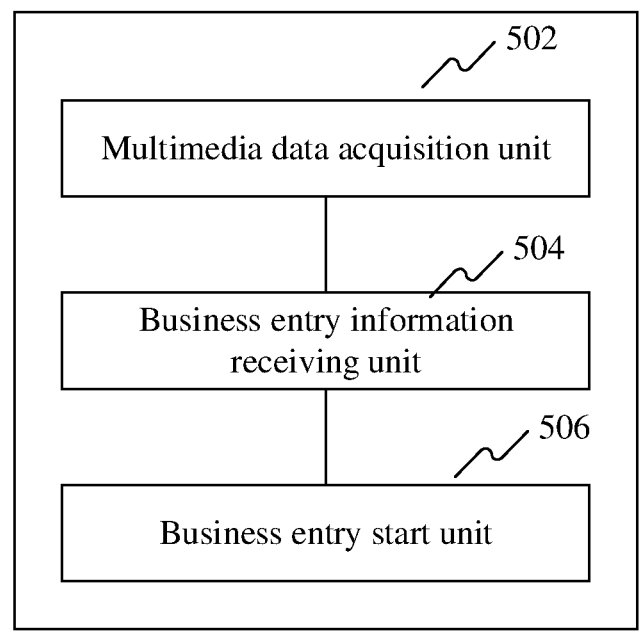
FIG. 5 is a block diagram of a business process starting apparatus applied to a terminal, according to an embodiment.

FIG. 5 is a block diagram of a business process starting apparatus 500, according an embodiment. For example, the apparatus 500 is applied to a terminal and includes a multimedia data acquisition unit 502, a business entry information receiving unit 504, and a business entry starting unit 506. The multimedia data acquisition unit 502 is used for acquiring multimedia data carrying image data of a predetermined scenario, and uploading the same to a server; the business entry information receiving unit 504 is used for receiving business entry information returned by the server, wherein the server maintains a correspondence between standard image information of predetermined scenarios and business entry information, and the returned business entry information corresponds to standard image information matching the uploaded image data; and the business entry starting unit 506 is used for starting a business process based on the business entry information.

In some embodiments, the multimedia data carrying image data of a predetermined scenario includes a picture taken for the predetermined scenario, a video shot for the predetermined scenario, or scanned data of the predetermined scenario.

In some embodiments, the business entry information includes a page address of a business process starting page; and the business entry starting unit 506 is used for opening the starting page of the business process by using the page address.

In some embodiments, a client program of the server is installed on the terminal; and the page address includes a local page address of the client.

In some embodiments, the business entry information includes invoking information of a business entry program; and the business entry starting unit 506 is used for running the business entry program by using the invoking information.

In some embodiments, the correspondence between standard image information of predetermined scenarios and business entry information, which is maintained by the server, further includes a correspondence between standard image information of predetermined scenarios as well as geographic locations of the predetermined scenarios and the business entry information; and the apparatus 500 further includes a location information uploading unit (not shown) for uploading, to the server, location information of a geographic location where the terminal is currently located, such that the server searches predetermined scenarios for the standard image information matching the uploaded image data, wherein a distance from the predetermined scenario's address location to the uploaded location information does not exceed a set deviation threshold value.

In some embodiments, the predetermined scenario includes a merchant logo or a merchant trademark.

Figure 6:
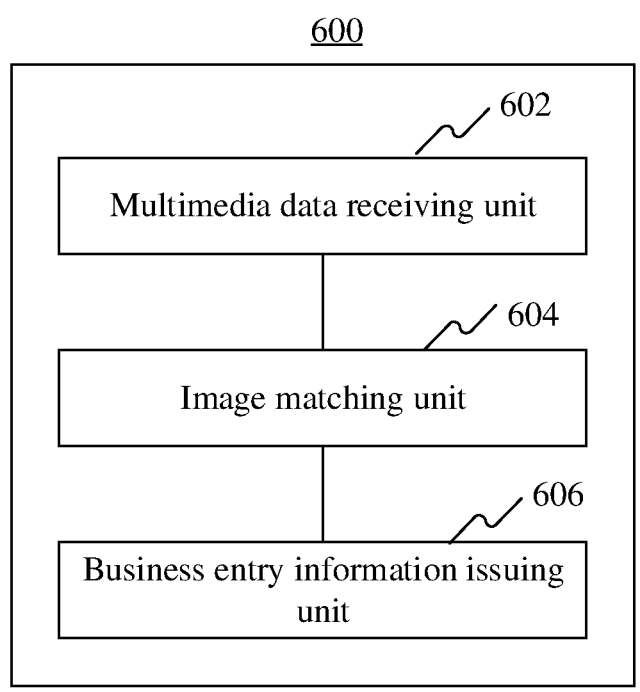
FIG. 6 is a block diagram of a business process starting apparatus applied to a server, according to an embodiment.

FIG. 6 is a block diagram of a business process starting apparatus 600, according to an embodiment. For example, the apparatus 600 is applied to a server, the server maintaining a correspondence between standard image information of predetermined scenarios and business entry information. The apparatus 600 includes a multimedia data receiving unit 602, an image matching unit 604, and a business entry information issuing unit 606. The multimedia data receiving unit 602 is used for receiving multimedia data which is uploaded by a terminal and carries image data of a predetermined scenario; the image matching unit 604 is used for searching for standard image information matching the uploaded image data; and the business entry information issuing unit 606 is used for returning, to the terminal, business entry information corresponding to the standard image information matching the uploaded image data, such that the terminal starts a business process based on the business entry information.

In some embodiments, the standard image information of a predetermined scenario includes a standard feature code generated according to a standard image of the predetermined scenario; and the image matching unit 604 is specifically used for generating an upload feature code according to the uploaded image data, and searching for a standard feature code of which a degree of matching with the upload feature code exceeds a set matching threshold value.

In some embodiments, the multimedia data carrying image data of a predetermined scenario includes a picture taken for the predetermined scenario, a video shot for the predetermined scenario, or scanned data of the predetermined scenario.

In some embodiments, the business entry information includes a page address of a business process starting page, or invoking information of a business entry program.

In some embodiments, the page address of a business process starting page includes a page address of a local page of a client installed on the terminal.

In some embodiments, the apparatus 600 further includes a scenario registration unit (not shown) for receiving a standard image of a predetermined scenario uploaded by a user and corresponding business entry information, and generating standard image information according to the standard image and saving a correspondence between the standard image information and the business entry information.

In some embodiments, the correspondence between standard image information of predetermined scenarios and business entry information, which is maintained by the server, further includes a correspondence between standard image information of predetermined scenarios as well as geographic locations of the predetermined scenarios and the business entry information; and the apparatus 600 further includes a location information receiving unit (not shown) for receiving location information of a current geographic location uploaded by the terminal; and the image matching unit 604 is specifically used for searching predetermined scenarios for the standard image information matching the uploaded image data, wherein a distance from the predetermined scenario's address location to the uploaded location information does not exceed a set deviation threshold value.

In some embodiments, the predetermined scenario includes a merchant logo or a merchant trademark.

Each of the above described units may be implemented as software, or hardware, or a combination of software and hardware. For example, each of the above described units may be implemented using a processor executing instructions stored in a memory. Also, for example, each of the above described units may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is provided a computer program product, such as a non-transitory computer-readable storage medium having computer-readable program instructions thereon for causing a processor to carry out the above-described methods.

The computer-readable storage medium may include permanent and non-permanent, movable and non-movable media and may realize information storage by means of any method or technology. The information may be a computer-readable instruction, a data structure, a program module or other data. Examples of a computer-readable storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a magnetic cassette tape, and a magnetic tape and magnetic disk storage or other magnetic storage devices or any other non-transmission media, which can be used to store information that can be accessed by a computing device.

It should be further noted that the terms "include," "comprise" or any variation thereof are intended to cover a non-exclusive inclusion, so that a process, method, article or device that includes a series of elements not only includes those elements but also includes other elements not expressly listed or inherent to such a process, method, article, or device. In the absence of more restrictions, the element defined by the phrase "including a . . . " does not preclude the presence of another identical element in the process, method, article or device that comprises the element.

A skilled person in the art should understand that embodiments of the specification can be provided as a method, a device, a system, or a computer program product. Therefore, the present application can take the form of an entirely hardware embodiment, an entirely software embodiment or an embodiment in combination of software and hardware.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A business process starting method, applied to a system including a server and a terminal, the server maintaining a correspondence between standard image information of predetermined scenarios and business entry information, each predetermined scenario corresponding to an object related to a business process to be started, the object being distinguishable by human eye, the method comprising:
receiving multimedia data uploaded by the terminal, the multimedia data carrying image data of a predetermined scenario;
searching for standard image information matching the uploaded image data; and
returning, to the terminal, first business entry information corresponding to the standard image information matching the uploaded image data, the first business entry information being configured to cause initiation of a payment process on the terminal,
wherein the correspondence between standard image information of predetermined scenarios and business entry information comprises a correspondence between the standard image information of the predetermined scenarios as well as geographic locations of the predetermined scenarios and the business entry information;
and the method further comprises:
receiving location information of a current geographic location uploaded by the terminal; and
searching, based on the uploaded location information, the predetermined scenarios for the standard image information matching the uploaded image data, wherein a distance from an address location of each of the searched predetermined scenarios to the uploaded location information does not exceed a set deviation threshold value, wherein the standard image information of the predetermined scenario comprises a standard feature code generated according to at least one of a color feature, a texture feature, a shape feature, or a spatial relationship feature of a standard image of the predetermined scenario; and the searching for the standard image information matching the uploaded image data comprises generating an upload feature code according to at least one of a color feature, a texture feature, a shape feature, or a spatial relationship feature of the uploaded image data, and matching standard feature codes of a plurality of distinct objects in a correspondence table with the upload feature code, to find a standard feature code of which a degree of matching with the upload feature code exceeds a set matching threshold value, wherein each of the plurality of distinct objects is one of a merchant logo or a merchant trademark.

2. The method according to claim 1, wherein the multimedia data carrying image data of the predetermined scenario comprises a picture taken for the predetermined scenario, a video shot for the predetermined scenario, or scanned data of the predetermined scenario.

3. The method according to claim 1, wherein the first business entry information comprises at least one of a page address of a business process starting page, or invoking information of a business entry program.

4. The method according to claim 3, wherein the page address of the business process starting page comprises a page address of a local page of a client installed on the terminal.

5. The method according to claim 1, further comprising:
receiving the standard image of the predetermined scenario uploaded by a user and corresponding business entry information, and generating the standard image information according to the standard image and saving a correspondence between the standard image information and the business entry information.

6. The method according to claim 1, wherein the predetermined scenario comprises at least one of a merchant logo or a merchant trademark.

7. A system, comprising:
a terminal; and
a server, the server maintaining a correspondence between standard image information of predetermined scenarios and business entry information, each predetermined scenario corresponding to an object related to a business process to be started, the object being distinguishable by human eye, the server comprising:
a processor; and
a memory for storing instructions executable by the processor;
wherein the processor is configured to:
receive multimedia data uploaded by the terminal, the multimedia data carrying image data of a predetermined scenario;
search for standard image information matching the uploaded image data; and
return, to the terminal, first business entry information corresponding to the standard image information matching the uploaded image data, the first business entry information being configured to cause initiation of a payment process on the terminal, wherein the correspondence between standard image information of predetermined scenarios and business entry information comprises a correspondence between the standard image information of the predetermined scenarios as well as geographic locations of the predetermined scenarios and the business entry information; and the processor is further configured to:

receive location information of a current geographic location uploaded by the terminal; and search, based on the uploaded location information, the predetermined scenarios for the standard image information matching the uploaded image data, wherein a distance from an address location of each of the searched predetermined scenarios to the uploaded location information does not exceed a set deviation threshold value, wherein the standard image information of the predetermined scenario comprises a standard feature code generated according to at least one of a color feature, a texture feature, a shape feature, or a spatial relationship feature of a standard image of the predetermined scenario; and the processor is further configured to generate an upload feature code according to at least one of a color feature, a texture feature, a shape feature, or a spatial relationship feature of the uploaded image data, and match standard feature codes of a plurality of distinct objects in a correspondence table with the upload feature code, to find a standard feature code of which a degree of matching with the upload feature code exceeds a set matching threshold value, wherein each of the plurality of distinct objects is one of a merchant logo or a merchant trademark.

8. The system according to claim 7, wherein the multimedia data carrying image data of the predetermined scenario comprises at least one of: a picture taken for the predetermined scenario, a video shot for the predetermined scenario, or scanned data of the predetermined scenario.

9. The system according to claim 7, wherein the first business entry information comprises at least one of: a page address of a business process starting page, or invoking information of a business entry program.

10. The system according to claim 9, wherein the page address of a business process starting page comprises a page address of a local page of a client installed on the terminal.

11. The system according to claim 7, wherein the processor is further configured to:
receive the standard image of the predetermined scenario uploaded by a user and corresponding business entry information, and generate the standard image information according to the standard image and save a correspondence between the standard image information and the business entry information.

12. The system according to claim 7, wherein the predetermined scenario comprises at least one of a merchant logo or a merchant trademark.

13. A non-transitory computer-readable storage medium having stored therein instructions that, when executed by a processor of a server in a system including the server and a terminal, cause the system to perform a business process starting method, the server maintaining a correspondence between standard image information of predetermined scenarios and business entry information, each predetermined scenario corresponding to an object related to a business process to be started, the object being distinguishable by human eye, the method comprising:

receiving multimedia data uploaded by the terminal, the multimedia data carrying image data of a predetermined scenario;

searching for standard image information matching the uploaded image data; and returning, to the terminal, first business entry information corresponding to the standard image information matching the uploaded image data, the first business entry information being configured to cause initiation of a payment process on the terminal, wherein the correspondence between standard image information of predetermined scenarios and business entry information comprises a correspondence between the standard image information of the predetermined scenarios as well as geographic locations of the predetermined scenarios and the business entry information; and the method further comprises:

receiving location information of a current geographic location uploaded by the terminal; and searching, based on the uploaded location information, the predetermined scenarios for the standard image information matching the uploaded image data, wherein a distance from an address location of each of the searched predetermined scenarios to the uploaded location information does not exceed a set deviation threshold value, wherein the standard image information of the predetermined scenario comprises a standard feature code generated according to at least one of a color feature, a texture feature, a shape feature, or a spatial relationship feature of a standard image of the predetermined scenario; and the searching for the standard image information matching the uploaded image data comprises generating an upload feature code according to at least one of a color feature, a texture feature, a shape feature, or a spatial relationship feature of the uploaded image data, and matching standard feature codes of a plurality of distinct objects in a correspondence table with the upload feature code, to find a standard feature code of which a degree of matching with the upload feature code exceeds a set matching threshold value, wherein each of the plurality of distinct objects is one of a merchant logo or a merchant trademark.

\* \* \* \* \*